(No Model.)
W. D. LEAVITT.
CHURN.
No. 258,658. Patented May 30, 1882.
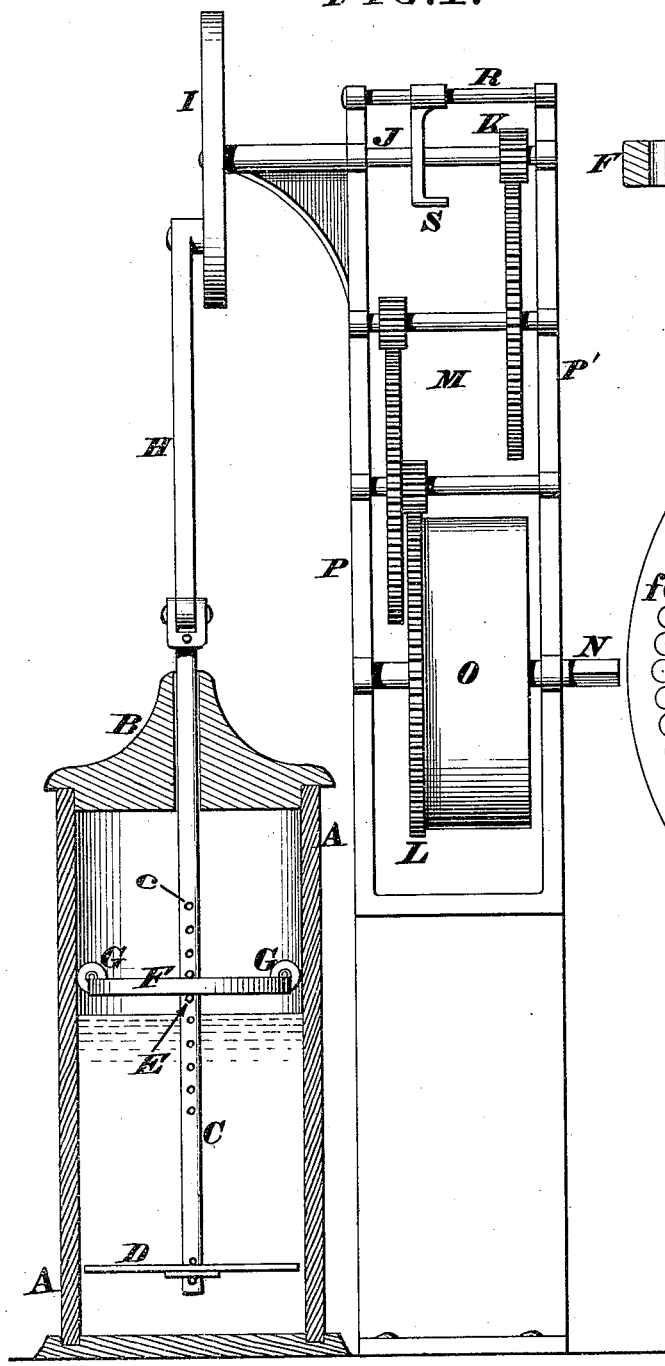
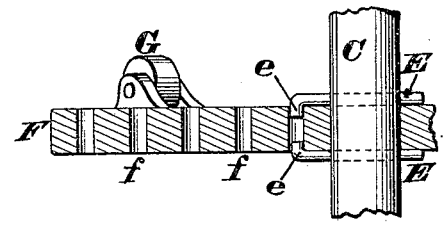
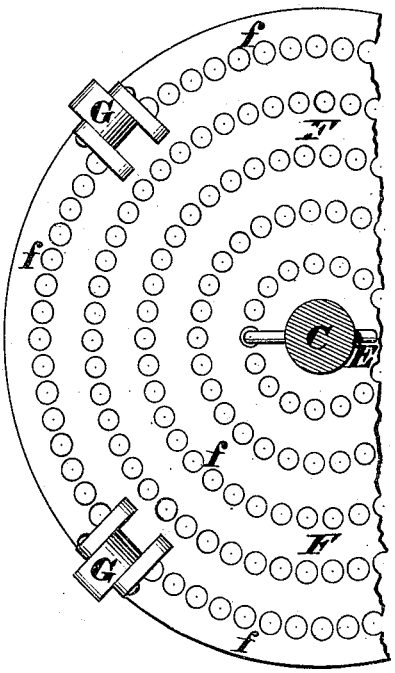
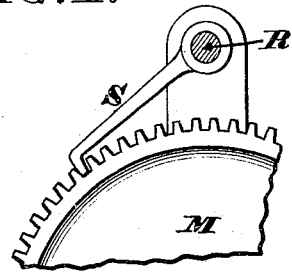
Attest:
John Beeler
John W. Layman
Inventor:
William D. Leavitt
by James N. Layman
Attorney

UNITED STATES PATENT OFFICE.

WILLIAM D. LEAVITT, OF CINCINNATI, OHIO, ASSIGNOR OF ONE-HALF TO GEORGE B. MOORE, OF SAME PLACE.

CHURN.

SPECIFICATION forming part of Letters Patent No. 258,658, dated May 30, 1882.

Application filed September 12, 1881. (No model.)

*To all whom it may concern:*

Be it known that I, WILLIAM D. LEAVITT, of Cincinnati, Hamilton county, Ohio, have invented certain new and useful Improvements in Churns, of which the following is a specification.

The first part of my invention consists in attaching an adjustable perforated disk to a churn dash-rod with pins whose heads spring into said perforations, and thereby prevent said pins working loose, as hereinafter more fully described.

The second part of my invention consists in providing said disk with a series of small rollers that act as guides to said disk and diminish the friction incidental to the operation of the churn, as hereinafter more fully described.

In the annexed drawings, Figure 1 is an axial section of my churn, the dog being disengaged from the train. Fig. 2 is an enlarged vertical section through a portion of the perforated disk. Fig. 3 is a plan of the same. Fig. 4 shows the dog engaged with one of the wheels of the train.

The churn-barrel A is closed with a head, B, traversed by a rod, C, having at its lower end a dash, D, said rod being provided with a series of perforations, c, to admit pins E, wherewith the disk F is attached to the rod C. This disk is somewhat less in diameter than the barrel A, and is pierced with numerous perforations, f, said disk having journaled to it three or more small guiding-rollers, G, adapted to run against the interior of said barrel. Dash-rod C is coupled by a rod, H, to a fly-wheel, I, on one end of a shaft, J, to which latter is secured a pinion, K, driven from the master-wheel L by a train of clock-work, M. This master-wheel is applied to a shaft having a winding-arbor, N, for coiling the mainspring O, wherewith is driven the gearing K L M; or, if preferred, the train may be run with a weight. This train of clock-work is journaled in a pair of pillar-plates, P P', one of whose tie-rods, R, carries a sliding dog or detent, S, capable of being engaged with one of the gear-wheels, as seen in Fig. 4.

The perforated disk F must be so adjusted on the rod C as to be slightly above the level of the milk in churn A when the dash D is at the lower end of its stroke, which attachment of said disk is effected by passing pins E through the holes c, and then allowing the bends e of said pins to spring into the perforations f, as seen in Figs. 2 and 3. By this expedient any accidental shifting of said pins is prevented, no matter how rapidly the dash is operated. The train of clock-work being now wound up, dog S is disengaged from the train and a rapid reciprocating movement is at once imparted to the dash-rod C and its attachments D F G. As rod C descends the butter is thrown up through the annular space between the disk F and barrel A, while the buttermilk escapes through the perforations f of said disk. Consequently the butter gradually accumulates on the disk or shelf F, and can be readily removed from time to time after the lid B has been detached. During the working of the churn the rollers G run along the interior of the barrel A, and thereby coact with dash D in confining rod C to a vertical path, by which means the use of special guides for said rod is obviated.

When it is desired to arrest the train for the purpose of recharging the churn or otherwise the dog S is temporarily engaged either with the pinion K or the wheel gearing into it.

I claim as my invention—

1. The perforated disk F f, attached to the pierced dash-rod C c by pins E E, whose heads e e snap into said perforations f, as and for the purpose described.

2. The combination, in a churn, of rod C, dash D, and adjustable perforated disk F f, which latter carries the guiding-rollers G, for the purpose stated.

In testimony whereof I affix my signature in presence of two witnesses.

WILLIAM D. LEAVITT.

Witnesses:
JAMES H. LAYMAN,
D. S. VANPELT.